US012712861B1

(12) United States Patent
Kutch et al.

(10) Patent No.: US 12,712,861 B1
(45) Date of Patent: Aug. 18, 2026

(54) SECURE TUNNELING MECHANISM AND DATA HANDLING PROTOCOL FOR PEER-TO-PEER DECENTRALIZED NETWORKING

(71) Applicant: Cortwo Corp., Dallas, TX (US)

(72) Inventors: Aaron Kutch, Dallas, TX (US); Gil Meir, Dallas, TX (US)

(73) Assignee: CORTWO CORP., Dallas, TX (US)

( * ) Notice: Subject to any disclaimer, the term of this patent is extended or adjusted under 35 U.S.C. 154(b) by 0 days.

(21) Appl. No.: 19/253,015

(22) Filed: Jun. 27, 2025

(51) Int. Cl.
*H04L 9/40* (2022.01)

(52) U.S. Cl.
CPC ................................ *H04L 63/0457* (2013.01)

(58) Field of Classification Search
CPC .................................................. H04L 63/0457
See application file for complete search history.

(56) References Cited

U.S. PATENT DOCUMENTS 9,900,160 B1 * 2/2018 Barbour ................ H04L 63/126
11,425,099 B1 8/2022 Warmenhoven
11,750,580 B2 9/2023 O'Connell et al.
12,010,102 B1 6/2024 Pabijanskas et al.
12,309,132 B1 5/2025 Gaist
2003/0233538 A1 * 12/2003 Dutertre .................. H04L 63/08 713/151
2010/0098252 A1 4/2010 Kanter et al.
2011/0252244 A1 10/2011 Lesea et al.
2017/0070890 A1 * 3/2017 Luff .................... H04W 12/106
2022/0029800 A1 1/2022 Sergeev et al.
2023/0247010 A1 * 8/2023 O'Connell ............. H04L 9/065 713/151
2023/0361994 A1 11/2023 Nix

FOREIGN PATENT DOCUMENTS

CN 107347073 A * 11/2017 ........... H04L 9/0869
CN 113973300 A * 1/2022 ............ H04W 12/02
CN 119011285 A * 11/2024 ........... H04L 69/321

OTHER PUBLICATIONS

Donenfeld, "WireGuard: Next Generation Kernel Network Tunnel," 2020.
Kjorveziroski, et al. "Full-mesh VPN performance evaluation for a secure edge-cloud continuum," Software Practical Experience, Wiley, 54:1543-1564, 2024.

* cited by examiner

*Primary Examiner* — Mohammed Waliullah
(74) *Attorney, Agent, or Firm* — M&B IP Analysts, LLC

(57) ABSTRACT

This disclosure describes a secure tunneling mechanism with DoS mitigation operating in a VPN-based mesh network. The mechanism uses a combination of static and temporal cookies to enable a server to identify peers while still retaining anonymity, and without requiring the server to perform expensive asymmetric cryptography (D-H) operations. In this approach, peers are identifiable by just performing hashes and using symmetric cryptography. The mechanism implements a generalized method of packet handling that provides for data scattering and gathering, thereby enabling encrypted frames conforming to a packet format and communicated by a peer to be spread across multiple physical packets both during a handshake, as well as during the exchange of data (between peers) during the session.

18 Claims, 3 Drawing Sheets

ENCRYPTED FRAME
202
200
204
210
206
208

UNIFIED MESSAGE TYPE
300
302
304
306
ENCRYPTED FRAME
308

SECURE TUNNELING MECHANISM AND DATA HANDLING PROTOCOL FOR PEER-TO-PEER DECENTRALIZED NETWORKING

BACKGROUND OF THE INVENTION

WireGuard is an open communication protocol that implements an authenticated and encrypted virtual private network (VPN) between cooperating peers. WireGuard utilizes both static keys and ephemeral keys to establish a secure VPN session. Static keys are long-term keys that act as the identity of each peer in a WireGuard network. Typically, a static key is the public key of a key pair that also includes an associated private key. Static keys are used for initial authentication of a peer, and to establish a secure channel between peers for a handshake process. The ephemeral keys are temporary keys that enable perfect forward secrecy; they are generated for each new session. In particular, during a handshake initiated by an initiator and directed to a responder, both the initiator and responder generate temporary, ephemeral key pairs. These keys are used in conjunction with the static keys in a Diffie-Hellman (D-H) key exchange and, in particular to derive symmetric session keys that are later used for encrypting and decrypting data during the session. Diffie-Hellman is a non-interactive key exchange; once the peers know each other's public keys, they create a common shared secret that only the two of them know, and without interacting with each other.

In Wireguard, the ephemeral handshake can only be completed and the secure authenticated session started if the two peers have exclusive control over their own private keys and know each others' public keys. Wireguard public keys, however, are not intended to be "public" in the usual sense of a server freely sending its public keys to the outside world. Although providing the public keys externally (to the peers using them) does not break encryption and authentication security, it introduces a potential Denial of Service (DoS) attack vector. This DoS exploit happens because a peer can start the process of an ephemeral handshake with a server with only knowledge of the server's public static key. In particular, and when the server's public key is known, an attacker can then (1) calculate a handshake initiation with a valid Message Authentication Code (MAC1), (2) send it and receive a cookie reply challenge from the server with a MAC that is invalid; (3) decrypt the handshake challenge (because it is decryptable with just knowledge of the server public key); and (4) and be able to generate a new handshake initiation with a valid MAC2 and send it to the server. The server will not know immediately which OOB registered peer is trying to initiate a session, or even if this is initiator has a valid OOB key that was preexchanged. It has to first perform an expensive Diffie-Hellman computation before it can decrypt a field and see who is attempting to contact it. In Wireguard, every physical packet delivering ephemeral session data over the internet typically is protected by an Authenticated Encryption with Associated Data (AEAD) that provides for both confidentiality and integrity of the data. In this scenario, the server performs the Diffie-Hellman multiplication only to find out that the AEAD fails. The attacker can initiate the same process on the server from various Internet Protocol (IP) addresses. Because the server can only process initiations at a given rate, even with multiple processing threads the attacker can use this attack to cause a complete DoS on the server.

WireGuard has a cookie system that can eliminate some DoS vectors, but not in the scenario described above when the server's static key is fully public. One potential solution to this particular DoS exploit is to have the server ignore handshake initiation(s) and always be the handshake initiator, but the orchestration necessary for that solution is problematic when clients are behind firewalls.

There remains a need to provide improved and enhanced secure tunneling protocol methods and systems.

SUMMARY OF THE INVENTION

In one aspect, this disclosure describes a secure tunneling mechanism with Dos mitigation operating in a VPN-based mesh network. The mechanism uses a combination of static and temporal cookies to enable the server to identify peers while still retaining anonymity, and without requiring the server to perform very expensive asymmetric cryptography (D-H) operations. In this approach, peers are identifiable by just performing hashes and using symmetric cryptography.

To this end, when a peer is first registered to a server in the network, OOB information (typically, static public keys) is created and exchanged. Using this information, the peers compute a static shared secret that only they know. Using the static shared secret and another value (e.g., a system time), each peer precomputes a set of hashes that once again are only known between the two peers, and these hashes are saved in a hash table. Advantageously, the static session setup does not requires either peer's public key to be revealed on the wire. Later, and when the server receives a packet from an unknown peer (e.g., to start a secure session), an "ephemeral session" between the unknown peer and the server is attempted to be initiated (with a handshake) to enable the server to determine whether it recognizes the peer. In response to a handshake request, the server first performs a hash table lookup (using a hash table cookie in the handshake message packet header) to see which peer the initiator is claiming to be. If the initiator is a legitimate client that has previously registered with the server, the hash table cookie should correspond to a static session established from the OOB information. If the hash is recognized, the server computes a Message Authentication Code (MAC) using the shared secret and the packet to pre-verify that the packet comes from an entity with control over that peer's secret key. This MAC verification is much faster than asymmetric cryptography such as D-H multiplication (or many AEADs). An attacker with sniffing capabilities could use the same precomputed hash value to pass the lookup table check, but without the static shared secret it could not pass the MAC check. If the server checks succeed, a handshake between the requesting peer (now recognized) and the continues. If, however, the hash table lookup or the MAC verification fails, the server takes a given action with respect to the request (e.g., rejection, rate-limiting, sand-boxing, or the like).

According to a further aspect, the secure tunneling mechanism implements a generalized method of packet handling that provides additional advantages. The method leverages a frame format that can support data that would otherwise be too large for handling in a WireGuard-style frame (limited by the standard internet MTU of 1500 bytes), and it provides for data scattering and gathering, thereby enabling encrypted frames conforming to the packet format and communicated by a peer to be spread across multiple physical packets both during a handshake, as well as during the exchange of data (between peers) during the session. The frame (more generally, a packet) format and handling method are sometimes referred to herein as an Intermediate Data Protocol (IDP). By enabling frames to be spread across multiple physical packets, arbitrary keys, including post-quantum cryptographic keys (that are larger than a single internet MTU packet), as well as virtual MTUs larger than the physical MTU, are supported. Further, the packet format enables common header prefixes that would normally be repeated across multiple packets to be elided and reconstructed on the receiving peer to reduce communication overhead. IDP also batches multiple small packets together in one physical packet where possible. Thus, accommodates arbitrary keys (such as very long PQC keys), as well as makes a more efficient use of the bandwidth by reducing overhead. Preferably, IDP is used as the same transmission format for transmitting large PQC keys during a handshake over a static session, and for delivering IP packets over an ephemeral session. Stated another way, communicating PQC keys provides the additional advantage of enabling the peers to use PQC to derive further shared secrets that in turn are applied to guard the IDP frames from tampering.

The foregoing has outlined some of the more pertinent features of the disclosed subject matter. These features should be construed to be merely illustrative. Many other beneficial results can be attained by applying the disclosed subject matter in a different manner.

DETAILED DESCRIPTION OF THE INVENTION

Figure 1:
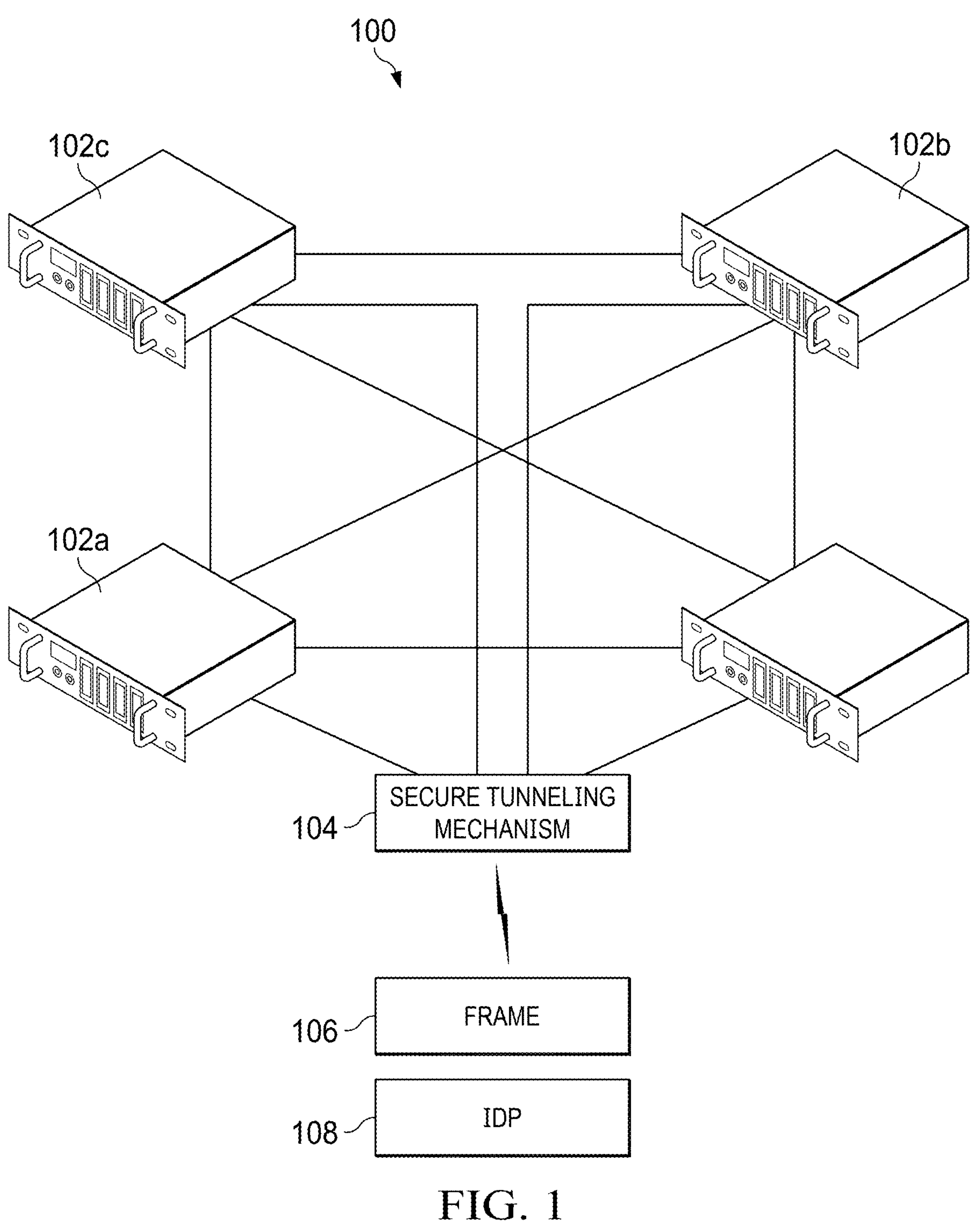
FIG. 1 a high level depiction of a mesh network of peer nodes that communicate with one another via the secure tunneling mechanism of this disclosure.

FIG. 1 depicts a mesh network 100 of peers 102 that communicate with one another. The mesh network is a configuration of a VPN-style secure tunneling protocol and, like WireGuard, where all participating devices (the peers) can directly connect to each other, forming a decentralized, peer-to-peer network. Typically, a peer is a computing machine or device comprising one or more processors, memory and storage, an operating system, network and other communication interfaces, programs, state machines, and tools. The secure tunneling typically is implemented as computer software, namely, a set of program instructions, stored in memory or in storage, and executed by a processor (forming a secure tunneling mechanism). Unlike traditional VPNs that often rely on a central server, a mesh network of this type allows for direct, secure communication between any two devices within the network, leading to potentially faster and more efficient data transmission. As depicted, a pair of peers typically corresponds to a client 102*a* requesting a service, and a server 102*b*. The server 102*b* is the machine that provides the service to the client directly, or indirectly. An example of the latter case is a relay server 102*c* through which the client reaches some other server that provides the service. The particular manner in which the mesh network is configured is not a limitation of this disclosure and, indeed, the mesh network configuration may be static or dynamic as peers join or leave the mesh. In general, a computing machine configured with the secure tunneling mechanism of the disclosure may also be considered a mesh network "node."

As described above, the secure tunneling mechanism 104 includes a special frame format 106, together with a packet handling method 108. As will be described in detail below, the packet handling method 108 provides for data scattering and gathering, and it enables encrypted frames to be spread across multiple physical packets both during a handshake, as well as during the exchange of data (between peers) during the session. As noted above, the frame format and handling method comprise an Intermediate Data Protocol (IDP). This nomenclature is not intended to be limiting.

Figures 2, 3:
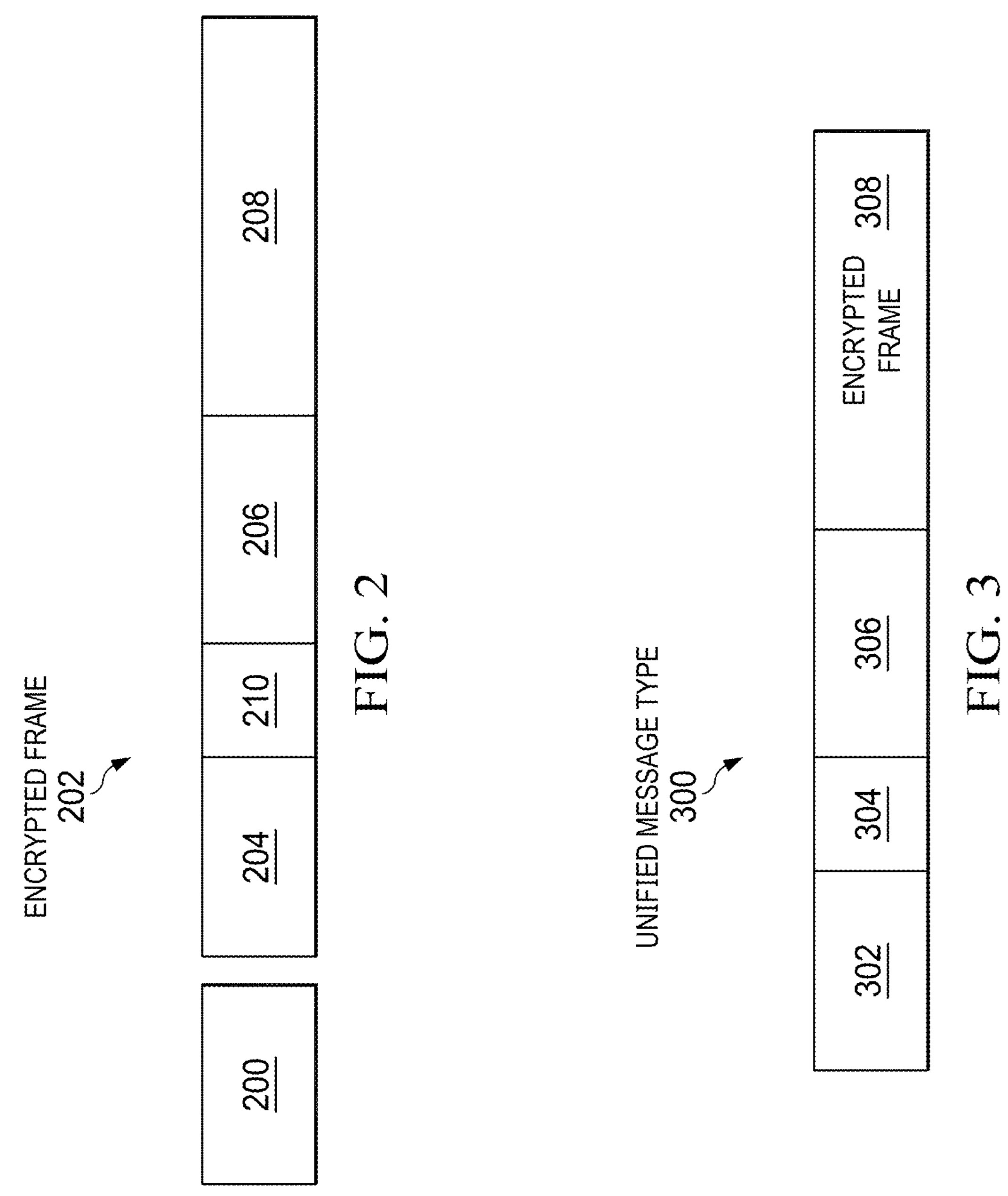
FIG. 2 depicts a representative frame format of an Intermediate Data Protocol (IDP) of the secure tunneling mechanism.
FIG. 3 depicts a unified message type structure of the secure tunneling mechanism of this disclosure.

By way of brief background, and as in a conventional WireGuard implementation, every physical packet delivering ephemeral session data over the internet (and thus over a tunnel using the protocol here) is protected by an AEAD. AEAD, refers to Authenticated Encryption with Associated Data, a common primitive for data encryption that provides for secrecy (nothing about the plaintext is known, except its length), authenticity (the encrypted plaintext underlying the ciphertext cannot be changed with being detection), symmetry (the same key is used for encrypting and decrypting the ciphertext), and randomization (the encryption is randomized so that two messages with the same plaintext yield different ciphertexts). In WireGuard, there is a short prelude of some WireGuard-specific data to identify the message type and ephemeral session, followed by a counter value for the specific packet, followed by the encrypted frame of the protected session data (which is always a whole IP packet, followed by an AEAD tag. The counter value identifies each packet uniquely in order and is used as input to the AEAD for the particular packet, and received values can be tracked in a window to prevent trivial replay attacks. The secure tunneling mechanism 104 here provides a similar functionality, however, and with reference now to FIG. 2, in one embodiment the AEAD tag 200 is moved ahead of the encrypted frame 202. This is not a limitation, as in a variant embodiment, the AEAD may be located elsewhere (such as trailing the encrypted frame). As depicted, and the frame 202 comprises an IDP multimessage header 204 followed by a set of IDP stack machine opcodes 206 and data 208 (which in turn generates IP packets and other kinds of information as necessary). As also depicted, optionally the encrypted frame 202 also includes an additional header 210, which facilitates an anti-DOS function. Header 210 thus is sometimes referred to herein as an anti-DOS header, and it may be created by extending or augmenting some other header.

Referring back to FIG. 1, the packet handling method of the secure tunneling mechanism handles packets in a manner that is markedly different from WireGuard. In WireGuard, the handshake packets are mostly plaintext and have to be constructed carefully with different AEAD setups to avoid complicated replay attacks, where an attacker takes a valid handshake packet, and changes a particular field that can trigger some malicious condition even though the attacker does not know how to interpret the rest of the packet without OOB data. WireGuard's handshake format is also vulnerable to DoS, as described earlier. Instead of adapting IDP to support a similar way of handling packets, the secure tunneling mechanism here implements a notion called a "static session" (as opposed to the "ephemeral sessions"). As mentioned above, a static session leverages the fact that peers (of a peer pair) in the system have previously created a "static shared secret" between them and that only they know. In a typical scenario, a static shared secret is created by a client peer when it first registers with a server peer. Later, when an unknown peer then initiates a handshake to the server and the typical OOB transfers occur, the shared secret value (previously computed by the server) is used to derive inputs to AEAD. When peers start their state machines in preparation for connection, preferably they register special permanent sessions that act just like the ephemeral sessions, except that the identifiers preferably are large hash values, and the counters preferably are 128 bit random nonces. With this paradigm, the same general packet setup is then used both during and before ephemeral session establishment. In particular, the keys (including large PQC keys) and handshake messages are delivered as different message types in parallel to the IP message type and share the same IDP framework. Other metadata types can be transferred over this static session as well, as long as they do not need to have forward security guarantees.

Thus, by leveraging static session setup, namely, the creation (off-line, or out-of-band vis-à-vis a session) static shared secret enables the secure tunnel mechanism to employ a single unified message type 300 consisting of a session identification value 302, followed by an AEAD nonce 304, an AEAD tag 306, and the encrypted frame 308 with IDP inside. With static session setup, a further advantage is that only a hash is seen so that the public key is not revealed on the wire (and this is also true for the ephemeral session. The same hash may be used over long periods of time. If the use of the same hash in this manner is deemed to create a risk to anonymization, there are several variants that may be implemented. The first variant implements the anti-DOS header (either as a standalone header or an extension of some other header in the packet). The anti-DOS header comprises an additional field, e.g., added the static session identifier 302 that includes an HLC (Hybrid Logical Counter). This value by itself may use the system time so that trivial replay attacks with older packets cannot happen. The anti-DOS header may also include an additional field after that contains a MAC result. In one example embodiment, this MAC is calculated using the HLC, AEAD nonce, some shared secret value calculated from the OOB statics, and/or a random fast CRC of the rest of the packet. The resulting lightweight MAC typically only involves an input of up to 64 bytes and is much faster than even AEAD authentication. This shorter verification section is used to easily reject all kinds of malicious packets at wire speed. As an alternative to the anti-DOS header as configured above, the mechanism may implement alternating time window static sessions. In general, an alternating time window is a technique of creating new hash table cookies and static sessions over time to supply better anonymization and replay protection. In particular, and in >99% of cases, computers across the world have good system times that have errors of less than a second from each other. In this alternative embodiment, and by default, every, say, x seconds the mechanism uses a quotient of a current UNIX time multiplied by the value x to calculate a window number that a peer can independently calculate as well. This window number is then hashed with static shared secret values to produce a completely indistinguishable fresh session identifier that will be valid for a next time period of 10 seconds. Two of these time window sessions are alive at any one time, both staying alive for 10 seconds but with a 5 second offset from each other. When choosing a static session to use, the network handler layer first chooses the time window session with a lifetime that it is closest to the middle of the 10 second time period, which should be alive for plenty of time for single handshakes to occur. The permanent static session remains as a fallback in the rare case the system time is wrong. These two methods make it extremely difficult for an attacker to get a peer to even begin to decrypt any packet sent to it. Further, the anti-DoS header and the alternating time window technique can be used together, e.g., with the anti-DoS header being used and comprising a hash table cookie of one of the static sessions generated by the alternating time window, followed by a MAC cookie (having an HLC in it to help prevent nonce reuse). In such case, the MAC cookie is not a MAC authentication tag (typically included along the AEAD tag as noted above), but serves as a main input to the MAC function. The MAC also includes the shared secret value and other optional information as referenced above. Generalizing, the above technique(s) achieve the same anonymization over time that WireGuard has but without succumbing to the DoS attack vector problem.

In a preferred embodiment, a packet used in the secure tunneling mechanism herein (with IDP) looks like a UDP header followed by an anti-DoS header following by an AEAD encrypted frame followed by an AEAD tag and MAC tag. The encrypted frame, when unencrypted into plaintext, is an IDP multimessage reassembly frame (unlike WireGuard, which always has a full IP packet). When a sequence of IDP reassembly frames are assembled back together, they have IDP stack machine opcodes followed by data. The IDP stack machine is processed to produce IDP messages, which produce handshake data, IP packets, and other arbitrary data.

The following describes a convenient technique by which a first peer (e.g., a client) registers to a second peer (e.g., a server, or relay server), and the creation of the static shared secret for the pair. As noted above, typically this is an off-line or out-of-band process) and wherein a requesting peer first registers with the server, and wherein the OOB data that establishes secret data for (a later) static session is exchanged. Following registration, and when the peer initiates a handshake to that server and the handshake is successfully performed, the peers arrive at an ephemeral common shared secret and symmetric encryption and authentication can begin, followed by ephemeral session establishment over which encrypted data is sent and received. As previously noted, this technique uses a combination of static and temporal cookies to enable the server to identify peers while still retaining the same anonymity as WireGuard, but without requiring the server to perform very expensive asymmetric cryptography (D-H) operations. In this approach, peers are identifiable preferably by just performing hashes and using symmetric cryptography.

To this end, when a peer is first registered to a server in the network, OOB information (typically, static public keys) is created and exchanged. Using this information, the peers compute a static shared secret that only they know. Using the static shared secret and another value (e.g., a system time), each peer precomputes a set of hashes that once again are only known between the two peers, and these hashes are saved in a hash table. Later, and when the server receives a packet from an unknown peer (e.g., to start a secure session), an "ephemeral session" between the unknown peer and the server is attempted to be initiated (with a handshake) to enable the server to determine whether it recognizes the peer. In response to a handshake request, the server first performs a hash table lookup (using a hash table cookie in the handshake message packet header) to see which peer the initiator is claiming to be. This is the static cookie referenced above. In particular, if the initiator is a legitimate client that has previously registered with the server, the hash table cookie should correspond to a static session established from the OOB information. If the hash is recognized, the server computes a Message Authentication Code (MAC) using the shared secret and the packet to pre-verify that the packet comes from an entity with control over that peer's secret key. As previously noted, this MAC verification is much faster than asymmetric cryptography such as D-H multiplication (or many AEADs). An attacker with sniffing capabilities could use the same precomputed hash value to pass the lookup table check, but without the static shared secret it cannot pass the MAC check.

The following provides details regarding IDP, which as noted above is a generalized packet handling technique that can be used in both the handshake mechanism and in the encrypted IP packet delivery using the secure tunneling. IDP by itself is a general method of scattering and gathering data. In addition to providing significant efficiencies at the header level, a primary benefit of IDP is that it enables frames to be spread across multiple physical packets. Thus, and unlike WireGuard, arbitrary keys-including any PQC key- and virtual MTUs larger than the physical MTU are supported by the secure tunneling mechanism. IDP also enables common header prefixes repeated across multiple packets to be elided and reconstructed later to reduce overhead. It also enables batch multiple small packets together in one physical packet. As such, can at the same time accommodate arbitrary keys such as very long PQC keys as well as make a more efficient use of the bandwidth by reducing overhead. Unlike Wireguard, which has partially unencrypted packet formats for handshakes that are separate from the format used for the ephemeral session, the approach herein uses a single IDP format, with the difference that handshake is transmitted over a non-forward-secure static session, and the IP packets are transmitted over a forward-secure ephemeral session established in the static one. In this way, the secure tunneling mechanism of this disclosure does not have to have separate and complex fragmentation protocols and considerations for handshakes and IP packets.

IDP provides for a highly flexible and general purpose way of conveying information.

IDP Varints

In IDP, every opcode with input is encoded as a "varint", which is an LEB (Little Endian Base) encoded integer. This encoding works by the highest bit in a byte indicating if the next byte is also part of the integer. For example, unsigned integer values 0 to 127 are encoded as a single byte the normal way. Then, the integer values 128 to 16383 are encoded as at least two bytes with the first byte having its highest bit set to form a compact (or "canonical") representation. Any varint can have an additional byte appended without changing its logical integer value by setting the MSB of the last byte and then appending an all-zeros byte. Varints exhibit several useful properties. They can be stored one immediately after the other in their byte representations without any other information, and IDP can decode them individually in order, even if they have radically different magnitudes and byte lengths. They have the capability of being padded to any length by setting the MSB of the last bit and adding more bytes with just the MSB being set, terminating with a final zero byte. Hardware and special restricted implementations can use fixed width fields if desired, and even software with alignment restrictions can use this padding. Varints also have no limits on the size of the integers they can express. Base Varints can be modified with certain bits being reserved in other ways, e.g. zig-zag encoding signed integers by moving the sign bit to the LSB (least significant bit) of the entire Varint, or interpreting the LSB as an opcode bit like, which is leveraged in the IDP state machine. Further, all canonical representations except for value zero are made purely of nonzero bytes, which means that COBS-style encoding protocols can avoid considering properly constructed headers made up of nonzero varints.

IDP Frames

Every frame of IDP starts with a "message type" varint ('msg_type: MsgType'). Preferably, the 'MsgType's that correspond to different messages are not strictly defined, instead the mappings are specified in OOB information. A "frame" of zero or more bytes follows the message type, in a format preferably determined by the type. It is assumed that the handlers of parsed IDP frames know the total length of the frame in bytes even if the message type is not yet parsed. Whatever fields determine the length are handled by a lower level protocol, so that the message type varint at the very beginning is the only field common to all IDP frames. The frame length being handled externally enables the IDP state machine described below to have excellent semantics.

The following describes several IDP frame types.

There are several frame types, which are now described.

MultiMessage Frame Type

This frame type combines compression and fragmentation capabilities in a very efficient way. There are three different types of frames: a multimessage assembled frame (a given array of bytes that we start with and want to end with), a multimessage subframe (a slice of bytes from the whole assembled frame), and a multimessage reassembly frame (a subframe prefixed with some metadata that will allow reassembling multiple subframes back together to get the original assembled frame).

These logical units are delivered over multiple "packets" that can be from any protocol with certain requirements. Each packet delivers one reassembly frame and is assumed to also come with a "lower level counter." The approach is designed such that packets can be sent out-of-order and interleaved with packets delivering other multimessages, but still be able to be unambiguously reassembled. Note, however that, in the context of packet networks, multimessages are meant for short-range amalgamation to get around MTU issues and for compressing out common headers, which can be dropped as a whole on single packet loss. Because the tunneling mechanism is operating in an environment with independent packet units (where multimessages are needed), there is often already some counter provided by a lower level protocol. This is the case in protocols like WireGuard with encryption and authentication at the packet level, where there is a counter being used for AEADs. Here, IDP piggybacks off of this counter to save bytes. In most use cases, all of the subframes in the same multimessage sequence must have the same length (not strictly required in more general uses of the protocol, but in packet networks this is the case since it allows for determining the total assembled frame length ahead of time and easy packed buffering out-of-order).

The header for reassembly frames preferably consists of two (2) varints. These two values are written as the 'sequence_len' and the 'subframe_inx'. The sequence length is the total number of subframes in the contiguous incrementing counter sequence that are part of the same logical multimessage reassembly frame. All subframes in the sequence preferably have the same 'sequence_len'. 'sequence_len==0' is always invalid (this and the relation with 'subframe_inx' can help detect corruption problems in general use cases). 'subframe_inx' starts as 0 for the first subframe and increments for each subframe in the sequence, with the last subframe having 'subframe_inx==sequence_len−1'. 'subframe_inx>=sequence_num' is always invalid. The subframes are concatenated in sequence order to reproduce the assembled frame.

The lower level protocol counter, the sequence length, and the subframe index values can be used to order the packets in case of arbitrary delivery out-of-order.

IDP State Machine Format

IDP preferably leverages a state machine with two variables and a stack of bytes that preferably can have six (6) basic logical operations, each of which take a single unsigned integer input: (1) set_inx: sets an index variable "var0" for the state machine, (2) add_inx: adds the input value to var0, (3) store_special: stores the current var0 value added with the input value into a special variable "var1", (4) load_special: ignores the input, loads the special variable var1 into index variable var0, (5) push_len: pushes an input number of bytes starting from the current var0 to a stack buffer, and (6) pop_len: interprets the current state of the stack buffer as an IDP frame (except if the buffer is at zero length, in which case this is a no-op), then pops the input number of bytes off the stack buffer. An IDP state machine frame preferably starts with a varint of the number of opcode bytes before the data frame starts. Preferably, the index is always relative to the data start byte, and both the var0 index and var1 special index are initialized to zero. The previous opcode bit is set as zero, and 0→0 is set as already happened once. Preferably, opcodes are encoded together with their input values as varints, where the varint LSB is the opcode bit and the rest of the bits form the input value to the specified logical operations. These are instruction varints. In an example, a single instruction bit is used to encode the six logical operations of the stack machine effectively with every opcode varint. Because one bit is used for the instruction and the MSB is used for varint structure, that leaves 6 bits with representable input values 0-63. Because most common headers are of that size, this compression method exhibits average overheads of only 2-4 bytes per entire packet. IDP frames may also be compressed of IDP frames for further overhead reduction.

Post-Quantum Cryptographic Key Support

By way of backgrounds, it is known that most widely-used public-key algorithms rely for their security on the difficulty of one of three mathematical problems: the integer factorization problem, the discrete logarithm problem or the elliptic-curve discrete logarithm problem. All of these problems, however, are easily solved on a sufficiently powerful quantum computer. To address the threat quantum computing poses to current public-key algorithms, Post-Quantum Cryptography (PQC) research and development have focused on new cryptographic algorithms (usually public-key algorithms) that are presumed to be secure against a cryptanalytic attack by a quantum computer. Recent PQC solutions are based on various cryptographic techniques such as lattice-based cryptography, multivariate cryptography, hash-based cryptography, code-based cryptography, isogeny-based cryptography, and symmetric key quantum resistance.

IDP provides support for PQC technologies in the secure tunneling mechanism by allowing for transfer of arbitrarily large data, e.g., large PQC keys, in IDP frames. PQC enables the peers to derive shared secrets that in turn can then be used to guard the IDP frames from tampering. As a consequence, IDP further provides a post-quantum in that it guards against a future large scale quantum computer that might (e.g., in a conventional WireGuard setup) otherwise find the Diffie-Hellman secrets without a private key and thus decrypt communications. Because IDP can arbitrarily break up large packets and reconstruct them at a peer, theoretically any-sized post-quantum key can be leveraged. One non-limiting example is a post-quantum KEM, such as ML-KEM.

The secure tunneling mechanism has an additional advantage in that a peer is enabled to have more than one public key, and multiple peers with the same base public key are able to have independent sessions with the same peer, which enables certain special use cases. These features are enabled by including a state identifier.

Operating Environment

A representative (but non-limiting) operating environment in which the secure tunneling mechanism of this disclosure are implemented is a Continuous Universal Trust (CUT) architecture. As described in U.S. Pat. No. 12,309,132, the disclosure of which is incorporated herein by reference, this type architecture is accessible by multiple entities (typically end users, devices, services, enterprises or combinations thereof) that themselves are configured according to a "circle" construct. In this paradigm, a "circle" (sometimes referred to as a "trust circle") refers to a set of entities to which a particular continuous trust policy (or more generally a security policy) is applied by the CUT architecture. Thus, and for a particular enterprise, a circle may include all of the registered users, users group or other accounts of that enterprise and that are subject to a particular continuous trust policy that will be enforced (in the same manner) for all of the entities that comprise the circle. An end user client entity, or any service or other entity participating in CUT, and that registers with the system, has an associated CUT Identifier, and this identifier has one or more profiles, each of which corresponds to a particular circle. A given CUT Identifier may be associated with multiple circles.

The notion of trust with respect to the CUT architecture is built upon all interactions of an entity with other entities to provide for a universal trust paradigm. In this context, universal trust ensures that every entity on the network can be trusted (a global circle of trust), and each entity's trust is universal (a trust index or score for the entity is global). This trust is facilitated in the preferred embodiment by requiring each entity that operates in association with the CUT architecture to independently and separately authenticate itself to the core network and without regard to an authentication paradigm specific to a particular destination. Further, the notion of universality as provided for herein means that the trust is retained not just between, for example a pair of entities, but also universally across the core network. Thus, if a first entity independently (and separately from a second entity) has established trust with the core network, this trust is retained and applicable to all other communications with the core network.

A representative core network facilitates authentication by the registered entities of a given circle to the protected resources defined by the circle's security policy, as well as enforcing continuous trust. Advantageously, continuous trust is enabled throughout a particular interaction session between a circle's registered user and a target service provider. Thus, in a typical use case, the core network provides a registered user single sign-on (SSO) or other authentication services to facilitate the user's initial access to a target service provider, and then further enforces a continuous trust paradigm (as defined by the circle's security policy) as the user continues its interactions with the service provider during a session. Throughout this interaction, all traffic flows through the core network, but with all or part of the contents encrypted, as previously described.

A CUT network is a public overlay network that enforces specific identity and authentication rules to ensure that only authorized entities use the network. These identity and authentication rules are enforced at a network (as opposed to application) layer, and all data traffic is encrypted.

Figure 4:
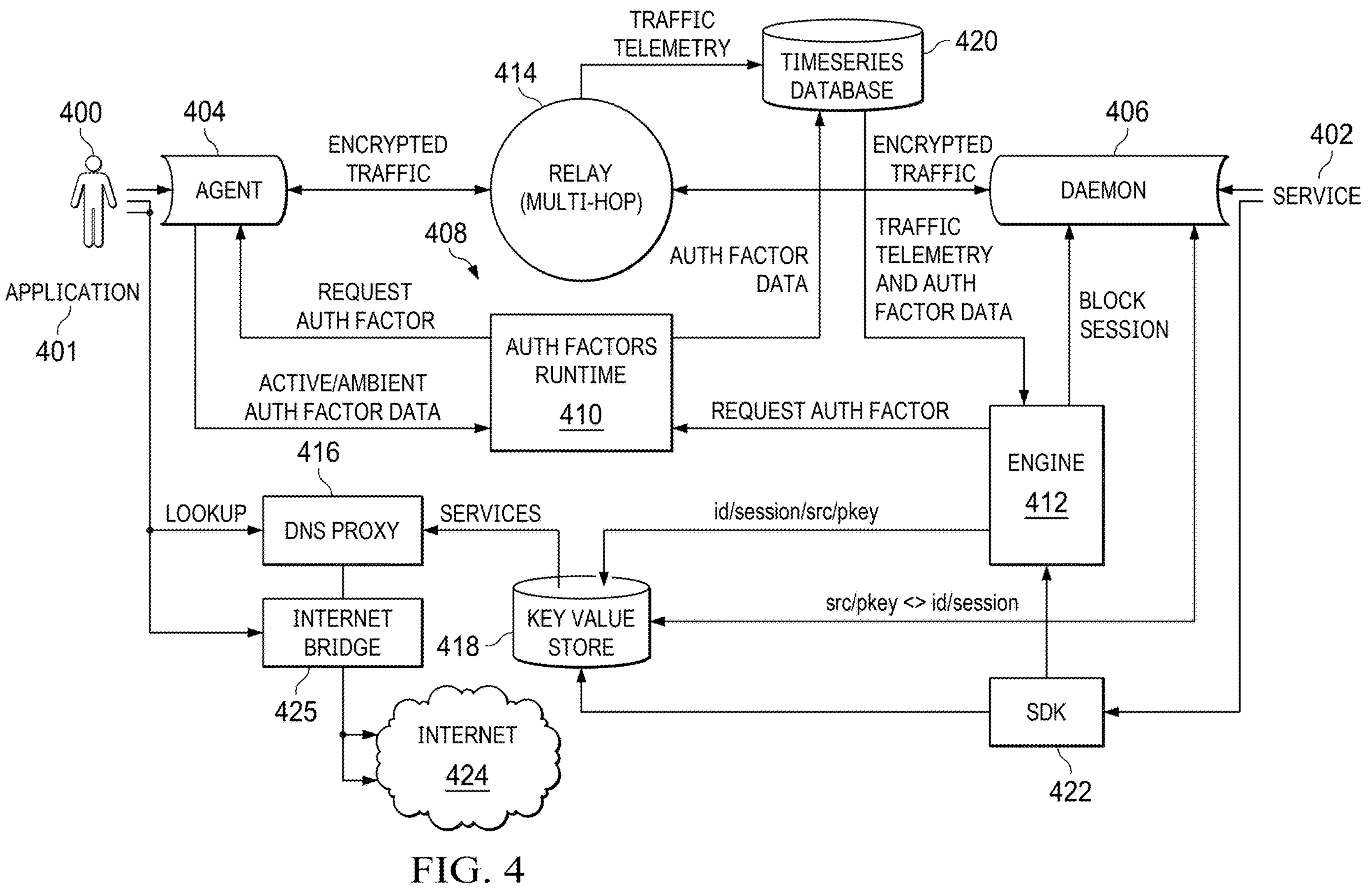
FIG. 4 depicts a representative continuous universal trust architecture in which the techniques of this disclosure may be practiced.

FIG. 4 depicts an example CUT architecture in a representative (but non-limiting) embodiment. In this embodiment, the end user 400 seeking access to a protected resource associated with a service 402 has an associated agent 404, and the service provider that provides the service 402 has an associated daemon 406. An application 401 executing on the end user device is any application functionality that generates a request for a protected resource located at the service 402. A typical application is a web browser, mobile app, native application code, or the like. As shown, the core network 408 (sometime referred to herein as an orchestration layer) comprises a number of components including an authentication factors runtime 410 that receives and manages ambient and active factors data, an engine 412 that uses the authentication factor and other data to manage and control the continuous trust processing, typically according to a circle's security policy, a relay 414 (such as the secure VPN protocol and tunneling mechanism of this disclosure) through which traffic flows pass, a DNS proxy 416 to facilitate hostname-based access to the continuous trust architecture and to locate services within the core network, together with one or more back-end databases and data stores, and related services. These databases and data stores include, for example: a key-value store 418 that stores authentication data, and a time-series database 420 that stores telemetry extracted from the traffic flows. As also depicted, an SDK 422 (or other such library) is provided to provide or facilitate one or more ancillary functions such as routing service traffic through the core, integrating identity management and other such services with the network, and to facilitate a third party service's leveraging of cores services. The SDK 422 typically is implemented as one or more application programming interfaces (APIs) to which third party service functions are hooked into the core network. Using these services, the SDK associates security profile(s) with circle(s) and their associated registered entities.

In this example embodiment, the DNS proxy 416 interacts with other Domain Name Services (DNS) on the publicly-routable Internet 424 in a known manner. To this end, hostnames that trigger access to the CUT architecture are received by the DNS proxy 416 (and, as necessary, Internet DNS) to obtain IP addresses of orchestration layer components, such as the relay through which traffic flows. In this embodiment, the CUT network itself is distinct from the Internet (as opposed to being an overlay), in which case an Internet bridge 425 is provided to provide a mechanism by which traffic flows enter and exit the core network, which in effect is air-gapped from the public Internet 424 otherwise. An example Internet bridge is a switch, router, proxy (e.g., Hyper), or the like. With this arrangement, the end user 400 or the participating service 402, as the case may be, safely interacts (with other entities) on the core network as opposed to the Internet generally, thereby significantly reducing the exposure of the end user or the service to Internet-based threats and attacks. While it is preferred that the end user or service always use the core network, this is not a requirement; for example, the service 402 may interact with the CUT-registered end user 400 over the core network 408 while also interacting with other end users (who are not registered with the core network) directly. In the latter case, a return path (not depicted) is provided from the service (or the daemon) to the public Internet, possibly through the Internet bridge. As also noted above, while in the preferred embodiment all communications with the Internet (by the participating entities) occur through the Internet bridge, this is not required, e.g., when the CUT is configured as an overlay on top of the publicly-routable Internet.

Referring back to FIG. 4, and as noted above, preferably all traffic originating from the client side and intended for the server-side, and vice-versa, during a session flows through the core network 408 and, in particular, through the relay 414 that is logically and physically positioned between the agent 404 and the daemon 406. As noted above, a representative relay is a secure VPN tunnel-based solution, such as Wireguard, although this is not a limitation. Wireguard provides a virtual network interface that has a unique public key (pkey) that is used to encrypt or decrypt the traffic at the tunnel endpoints. The pkey can also be used to facilitate validation of user identity, as will be described in further detail below. In an alternative embodiment, the traffic (or at least content portions thereof) is secured and delivered end-to-end with IPSec tunnels, HTTP/TCP with custom encryption, firewall-punching protocols (STUN, TURN, etc.) or the like depending on implementation. Generalizing, the nature and type of traffic that is delivered over end-to-end communication path should be broadly construed as covering any IP-based traffic regardless of the application layer, security wrapper, or the like.

Once again referring back to FIG. 4, the authentication factors runtime 410, operating in conjunction with the engine 412, provides initial and continuous authentication of the user or device during a given interaction session with the service provider. Together, module 410 and engine 412 are sometimes referred to as a controller (or continuous trust controller). As depicted, and as will be described further below, typically continuous authentication is based on authentication factors that are passed by the agent 404, such as one or more ambient factors, one or more active factors, or combinations thereof, as well as telemetry 413 extracted from the traffic flow(s). The telemetry 413 is collected as time-series data in the time-series database 420 and provided to the engine 412 for processing according to the security policy provided from the SDK 422. As depicted by the arrows, and depending on the determination(s) made by the engine, the agent may be instructed to increase the number of authentication factors that it provides to the authentication module (for evaluation of the entity's continued right to have access), or the daemon may be structured to block the session from proceeding further.

More generally, and based on one or more authentication factors and/or the telemetry, the engine is configured to dynamically change a given authentication requirement during an interaction session. Thus, in one example, at the outset of a workflow, only a first authentication requirement (e.g., weak authentication) is enforced; as the workflow continues, the engine then determines that a second authentication requirement (e.g., a somewhat higher authentication) is then needed, e.g., to ensure continued compliance with the security policy. The nature and scope of this authentication step-up in this example depends on the policy, the telemetry, and perhaps other factors (e.g., time of day, client location, service load, and others). Even later, and as the session continues, the engine may then determine to step-up the authentication requirement to an even higher level, e.g., because of the nature or type of follow-on request being made by the client. This is just a representative example, as the change that occurs to the authentication requirements may be a step-down (a relaxation) of the authentication requirement. Another example would be the authentication requirement being stepped-up, but then later returned to a lower authentication requirement. All of these examples are merely illustrative. Upon the initial authentication request, and/or whenever the engine determines that the authentication requirement should change, the engine receives the session, circle and user identifiers (and any associated PKC values), and makes the determination(s) about the nature and type of authentication requirement(s) that are then enforced (or continued to be enforced) by the system for the on-going session. To this end, the engine computes a set of trust indexes (also referred to herein as scores), typically one trust index per authentication factor, and uses this scoring data to determine if, when and to what degree the authentication requirement should be adjusted to maintain the continuous trust.

As noted above, in one embodiment a tunnel established between an end user and a service may have an associated unique public key (pkey). Using the IDP/Wireguard solution as described above, PQC keys are leveraged. FIG. 4 depicts the public key being used. In addition to its use for encryption and decryption, this key may be leveraged to validate user identity. For example, assume that during a particular interaction or session the system determines or reaches a "lower confidence" in the user's identity. At this point, an agent that has access to the pkey can trigger processing of an ambient (or even an active) authentication factor, thus enabling the system to associated identity with the pkey. (As a variant, some other local key may be tied to the user's identity, or a key exchange may be used). The service daemon then uses the pkey to both decrypt the traffic and to validate that that the traffic indeed originated from the identity. How the pkey is transmitted to the daemon is implementation-specific.

The CUT architecture in which the techniques of this disclosure are implemented is configured for multi-tenancy, and is highly-scalable to handle large numbers of requests from large numbers of requesting entities. As the system scales out, a continuous universal trust solution is then provided. Because preferably all traffic flows through the core network, and in addition to providing the per-session continuous authentication, the system can readily terminate sessions in the event of a cyber or other attack, and it can readily enforce circle policy compliance.

As noted above, it is not required that the system be implemented with an "agent" or a "daemon," as the functionality of these components may be built into or other integrated with the client or server, as the case may be. An "agent" that allows the system to collect and implement at least the ambient authentication factors greatly improves user experience, as this obviates one or more logins to the participating services. Also, the use of a dedicated agent that hooks into and intercepts potentially the entire traffic profile to and from the end user client enables the system to carry out more detailed behavioral analysis that is then leveraged to provide the continuous authentication. Telemetry data is readily captured as it flows through the infrastructure, all within requiring explicit SDK calls from the service provider.

Other Enabling Technologies

Typically, the computing platform or infrastructure that provides the core network is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user or an autonomous application, typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Authentication step-up or step-down determinations made by the engine may leverage machine learning. Thus, in a variant embodiment, the core network includes a machine learning system. The nature and type of Machine Learning (ML) algorithms that are used for determining whether changes to the continuous authentication should be implemented may vary.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that May be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below.

The invention claimed is:

1. A method of peer-to-peer networking in a network operating environment, comprising:

at a server peer:

receiving a registration request from a first peer, the first peer being one of a set of first peers;

generating a static secret shared by the first peer and the server peer; and using the static secret to precompute a set of one or more hashes saved to a hash table;

following the registration:

receiving a session request packet purporting to originate from an initiator peer;

determine, using the hash table, whether the initiator peer is recognized as one of the set of first peers;

upon a determination that the initiator peer is recognized as one of the set of first peers, performing a message check using the static secret previously associated to the initiator peer during a registration to the server peer to verify that the session request packet actually originates from the initiator peer;

when the message check succeeds, enabling initiation of a handshake protocol between the initiator peer and the server peer; and upon successful completion of the handshake protocol, receiving encrypted Internet Protocol (IP) packet delivery from the initiator peer;

wherein the handshake protocol and the encrypted IP packet delivery utilize a data protocol over which encrypted frames are spreadable across multiple physical packets.

2. The method as described in claim 1, wherein data involved in the handshake protocol or the encrypted IP packet delivery is data of an arbitrary size and that the data protocol has scattered into one or more encrypted frames.

3. The method as described in claim 2, wherein upon receipt of the one or more encrypted frames, the data protocol gathers and reassembles the data that has been scattered.

4. The method as described in claim 2, wherein the data is a post-quantum cryptographic (PQC) key.

5. The method as described in claim 2, wherein the data is a set of one or more virtual Maximum Transmission Units (MTUs) larger than a physical Maximum Transmission Unit (MTU).

6. The method as described in claim 1, wherein the server peer is a relay server.

7. The method as described in claim 1, wherein the data protocol has a unified message type.

8. The method as described in claim 7, wherein the unified message type comprises a session identification value, an Authenticated Encryption with Associated Data (AEAD) tag, and an encrypted frame.

9. The method as described in claim 8, wherein the unified message type also includes an anti-DoS header value.

10. The method as described in claim 8, wherein the unified message type supports multi-messages within an encrypted frame.

11. The method as described in claim 1, wherein the handshake protocol includes the initiator peer and the server peer generating an ephemeral common shared secret.

12. The method as described in claim 1, wherein when the message check fails, the server peer takes a mitigation action.

13. The method as described in claim 12, wherein the mitigation action is a rejection of a session request.

14. The method as described in claim 1, wherein the data protocol prefixes an Authenticated Encryption with Associated Data (AEAD) tag before each encrypted frame.

15. The method as described in claim 1, wherein an encrypted frame supports a multi-message header and one or more state machine operation codes.

16. The method as described in claim 15, wherein the information in the encrypted frame is structured as a set of encoded data structures having a compact representation.

17. A method of peer-to-peer networking in a network operating environment, comprising:

at a server peer:

receiving a session request packet purporting to originate from an initiator peer;

determining, using a hash table of one or more hash values, whether the initiator peer is recognized as one of a set of first peers that have previously registered with the server, a hash value in the hash table having been computed in a registration process that occurs prior to receipt of the session request packet;

upon a determination that the initiator peer is recognized as one of the set of first peers, performing a message check using a static secret previously associated to the initiator peer during a registration to the server peer to verify that the session request packet actually originates from the initiator peer;

when the message check succeeds, enabling initiation of a handshake protocol between the initiator peer and the server peer; and upon successful completion of the handshake protocol, receiving encrypted Internet Protocol (IP) packet delivery from the initiator peer;

wherein the handshake protocol and the encrypted IP packet delivery utilize a data protocol over which encrypted frames are spreadable across multiple physical packets.

18. An apparatus, comprising:

at least one processor, and computer memory holding computer program instructions executable by the at least one processor, the computer program instructions comprising program code configured to:

receive a session request packet purporting to originate from an initiator peer;

determine, using a hash table of one or more hash values, whether the initiator peer is recognized as one of a set of first peers that have previously registered with the server, a hash value in the hash table having been computed in a registration process that occurs prior to receipt of the session request packet;

upon a determination that the initiator peer is recognized as one of the set of first peers, perform a message check using a static secret previously associated to the initiator peer during a registration to the server peer to verify that the session request packet actually originates from the initiator peer;

when the message check succeeds, enable initiation of a handshake protocol between the initiator peer and the server peer; and upon successful completion of the handshake protocol, receive encrypted Internet Protocol (IP) packet delivery from the initiator peer;

wherein the handshake protocol and the encrypted IP packet delivery utilize a data protocol over which encrypted frames are spreadable across multiple physical packets.

* * * * *